(12) United States Patent
Heffner et al.

(10) Patent No.: US 8,773,674 B2
(45) Date of Patent: Jul. 8, 2014

(54) METHOD AND APPARATUS TO PROVIDE ENHANCED PRINTING FOR NEWLY LAUNCHED DEVICES IN A UNIVERSAL PRINTER DRIVER

(75) Inventors: Cody X. Heffner, Keizer, OR (US); David L. Salgado, Victor, NY (US); Jonathan A. Edmonds, Silverton, OR (US); Alan K. Robertson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 158 days.

(21) Appl. No.: 13/218,648

(22) Filed: Aug. 26, 2011

(65) Prior Publication Data

US 2012/0069366 A1 Mar. 22, 2012

Related U.S. Application Data

(60) Provisional application No. 61/384,115, filed on Sep. 17, 2010.

(51) Int. Cl.
*G06K 15/02* (2006.01)

(52) U.S. Cl.
USPC .......... 358/1.13; 358/1.15; 719/321; 719/327

(58) Field of Classification Search
CPC ..... G06F 3/12; G06F 3/1203; G06F 3/12004; G06F 3/1285
USPC .......... 358/1.13, 1.15; 719/321–327
See application file for complete search history.

(56) References Cited

U.S. PATENT DOCUMENTS

| | | | |
|---|---|---|---|
| 8,438,289 B1 * | 5/2013 | Grieve et al. | 709/227 |
| 2003/0184784 A1 * | 10/2003 | Ferlitsch | 358/1.13 |
| 2009/0063718 A1 * | 3/2009 | Sekine et al. | 710/8 |
| 2009/0091791 A1 * | 4/2009 | Ferlitsch | 358/1.15 |
| 2010/0083284 A1 * | 4/2010 | Onsen | 719/321 |

* cited by examiner

*Primary Examiner* — Qian Yang
(74) *Attorney, Agent, or Firm* — Fay Sharpe LLP

(57) ABSTRACT

A system for interfacing a universal print driver with a print device after the universal print driver is deployed. The system includes a universal print driver interfaced with a network and at least one associated print device. A repository stores a set of device compatibility packs (DCPs) for each of the at least one associated print device interfaced with the universal print driver. The universal print driver is adapted to search the repository for a DCP if the associated print device is unsupported by the print driver.

19 Claims, 3 Drawing Sheets

METHOD AND APPARATUS TO PROVIDE ENHANCED PRINTING FOR NEWLY LAUNCHED DEVICES IN A UNIVERSAL PRINTER DRIVER

CROSS REFERENCE TO RELATED PATENTS AND APPLICATIONS

This application claims the benefit of priority to U.S. Provisional Patent Application No. 61/384,115, filed Sep. 17, 2010, entitled "METHOD AND APPARATUS TO PROVIDE ENHANCED PRINTING FOR NEWLY LAUNCHED DEVICES IN A UNIVERSAL PRINTER DRIVER", by Cody X. Heffner et al., the disclosure of which is hereby incorporated by reference in its entirety.

BACKGROUND

The present application is directed toward a universal print driver for producing printouts from multiple print devices that can each be made compatible with the print driver after the print driver is deployed in a customer environment. The present application further relates to a method for installing and updating device-specific data files onto the universal print driver for supporting new print devices interfaced with the print driver after the print driver was initially installed.

A print driver is a software program that formats a document into a print-compatible language. The print driver is generally in communication with a destination print device through a network. The print driver receives a document in a first format and sends the document to the networked print device in a second, printer-ready format. More specifically, the print driver converts the data that is to be printed into a format that is specific to the print device. A decomposer then uses the data that is included in a print data stream to generate raster data, which eventually gets printed.

A traditional print driver is connected to a single device per printer object or print queue. A universal print driver, however, is a single printer driver that is compatible with multiple print devices. A first conventional type of universal print driver is referred to as a Global Print Driver ("X-GPD"), which can successfully print with full functionality to multiple devices. This type of universal driver is in communication with the print queue and becomes the driver for the print device that is connected with a client. Another conventional type of universal print driver is referred to as a Mobile Express Driver ("X-MED"). This type of universal print driver becomes the driver for the specific print device that is selected from a set of devices by the user, at the time that the print instruction is provided for the print job, for rendering a printout of a document.

However, these conventional types of universal print drivers provide the user with only the most basic functionalities of print devices that are interfaced with the network after the original version of the printer driver was installed. When a print instruction is received for producing a printout using a print device that is not yet supported by the conventional universal print driver, the print driver cannot access the advanced features of the unsupported device without being re-installed. Accordingly, the print device cannot use its full set of capabilities for producing the printout unless the print driver is upgraded on a server that is in communication with the print driver.

As mentioned, one aspect of conventional universal print drivers is that a new version of the print driver must be re-installed each instance when a print device is not supported by the original installation of the print driver. One drawback to the re-installment process is that Windows Hardware Qualifications Lab ("WHQL") certification restrictions require that upgrades to the conventional drivers be made through the server. Therefore, print drivers cannot update their capabilities without affecting all connected print queues.

There is henceforth needed a universal print driver that is adapted for effectively acquiring a device specific data file for the unsupported print device without having to undergo a re-installation process.

BRIEF DESCRIPTION

A first embodiment of the subject disclosure is directed toward a method for supporting multiple print devices interfaced with a print driver. The method includes providing the print driver with a repository of a set of print device specific files. The method further includes searching the repository for a DCP of a select one of the multiple print devices. The method also includes installing the DCP onto the print driver. The method includes using the information included in the DCP for rendering a printout using the select one print device.

Another embodiment of the present disclosure is directed toward a system for interfacing a universal print driver with a print device after the print driver is deployed. The system includes a universal print driver interfaced with a network and at least one associated print device. A repository stores a set of device compatibility packs (DCPs) for each of the at least one associated print device interfaced with the universal print driver. The universal print driver is adapted to search the repository for a DCP if the associated print device is unsupported by the print driver.

A further embodiment is directed toward a print driver. The print driver is interfaced with a network and in communication with an associated print device. The print driver adapted to determine if the associated print device is being pointed to after the print driver is deployed in a customer environment. The print driver further determine if the associated print device is being supported by the print driver. The print driver stores a repository location and searches the repository for a DCP if the associated print device is unsupported. If the DCP is found at the repository, the print driver further installs the DCP for supporting the associated print device. The print driver provides advanced features if the DCP is installed in the print driver and provides basic features if the DCP is not installed in the print driver.

DETAILED DESCRIPTION

Figure 1:
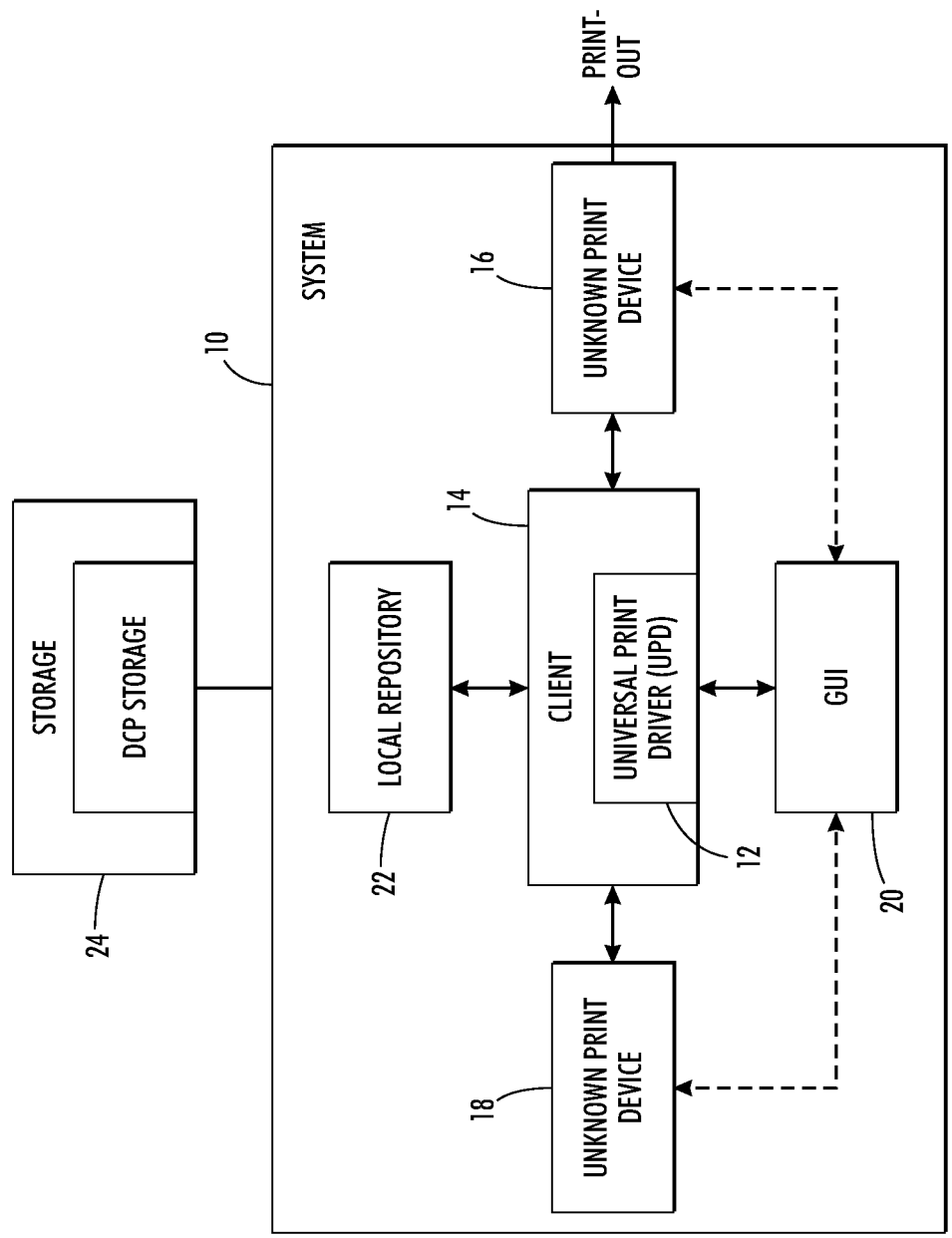
FIG. 1 is a schematic diagram of one embodiment of a system for providing advanced features of print devices interfaced with the print driver after the print driver is released.

The present disclosure is directed toward a system for producing printouts from multiple print devices that can each be made compatible with a universal print driver after the print driver is initially deployed in the customer environment. The present application further relates to a method for installing and updating device-specific data files (hereinafter referred to as "DCPs") onto the universal print driver for supporting print devices interfaced with the print driver after the print driver is installed.

The terms "device" or "print device", as used herein, refer to an image forming apparatus and can include any device for rendering an image on print media, such as a laser printer, bookmaking machine, or a multifunction machine having copying and/or faxing as well as printing capability. A printout is referred to as a rendering of a print job, for example, on print media using the print device. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the image forming apparatus and may include text, graphics, pictures, and the like. The operation of applying images to print media, for example, graphics, text, photographs, etc., is generally referred to herein as printing or marking. While in the exemplary embodiment, the device is described in terms of a xerographic printer, it is also contemplated that the device may incorporate inkjet or other marking technology.

The term Device Compatibility Pack ("DCP") refers to a compressed data file archive that contains device specific data including device images, driver constraints, and device capabilities, etc. A DCP is associated with one print device and contains a file describing the printable area for each paper size supported by the print device and a file describing the print device's branding and print ticket interface used. Furthermore, the DCP may contain halftones and color profiles to provide enhanced quality printing for the DCP's print device. The DCP may include attributes of the device functionalities, such as, for example, multi-pass operations, paper size limitations, available manual/duplex printing operations, print stock limitations, and available finishing options, such as, for example, hole-punching, binding, and stapling, etc.

The universal print driver relies on the content included in a DCP for producing specific products using the print device as a selected destination print device. Generally, a DCP is installed in the universal print driver of the present application for each one of the multiple devices that the universal print driver supports. The present application provides a process for installing a DCP to the universal print driver for the selected destination print device if the system determines that the print device is not yet supported by the universal print driver.

With reference to FIG. 1, a system 10 is shown for providing advanced features of at least one print device interfaced with a universal print driver according to the subject matter of the present disclosure. The system 10 includes the universal print driver 12, which can be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

In one embodiment, the universal print driver 12 is a processor that is included in a client computer 14 (hereinafter synonymously referred to as an "end-user"), which may be a PC, such as a desktop, a laptop, palmtop computer, portable digital assistant (PDA), server computer, cellular telephone, pager, or other computing device capable of executing instructions for performing the exemplary method. The system 12 may be further embodied in a networked image forming apparatus, although it is also contemplated that the system may be located elsewhere on a network to which the image forming apparatus is connected, such as on a server, networked computer, or the like, or distributed throughout the network or otherwise accessible thereto. The network interface allows the client to communicate with other devices via a computer network, such as a local area network (LAN), a wide area network (WAN), or the Internet, and may comprise a modulator/demodulator (MODEM).

With continued reference to FIG. 1, the system 10 further includes at least one print device 16, 18 in communication with the client computer 14. For purposes of describing the disclosure, a first print device 16 is shown as an "unknown print device 16", which includes an image forming apparatus that is not immediately supported by the universal print driver 12 after an initial installation of the universal print driver. More specifically, a DCP associated with the unknown print device 16 is not installed through the print driver 12 at the time when the print driver is initially deployed, but is rather adapted to be installed through the print driver when the print device associated with the DCP is subsequently called upon. In other words, the universal print driver 12 may not recognize the first print device 10. In the illustrated embodiment, the client computer 14 is further shown in communication with a second print device 18. The second print device is referred to herein as a "known print device 18", which is an image forming apparatus that is supported by the universal print driver 12 after its initial installation. The universal print driver 12 is adapted for updating the advanced capabilities of the known print device 18 through installing an updated version of the DCP associated with the known print device 18. There is, however, no limitation made herein to a number of clients or a number of print devices 16, 18 that are included in the system 10. In the contemplated embodiment, the first and second print devices 16, 18 can include different models with each model being adapted to perform a respective set of specialized functions.

With continued reference to FIG. 1, the system 10 further includes a graphical user interface ("GUI") 20, which is in communication with at least the client 14. The GUI 20 enables the user to interact with the universal print driver 12 and the print devices 16, 18. The GUI 20 collectively represents the input devices through which the system receives image editing and manipulation instructions entered or input by the user for producing a printout of the print job. More specifically, the GUI provides the user with print device-specific capabilities for enabling the user to make selections for specific print rendering conditions made available by the capabilities.

Additionally, the GUI 20 represents the output devices through which the user receives feedback with respect to the actions that are taken in response to the instructions that are entered by the user or otherwise, such as under program control. For example, the GUI 20 generally includes a keyboard or the like for entering user instructions, a display monitor for displaying the process that is being performed by the universal print driver 12, and a cursor controller for enabling the user to make selections from and/or enter data into a process that is being displayed by the monitor. The GUI can provide the user with drag-and-drop options, pull-down options, spread-sheet options, and any conventional, known option for building conditional logic for print-actions based on the attributes in parsed data.

With continued reference to FIG. 1, the system 10 further includes a repository 22 or DCP storage. The location of the repository 22 is specified in the universal print driver 12. The repository 22 stores a set of DCPs each associated with a respective one of the print devices 16, 18. The set of DCPs may include a DCP for at least one print device regardless of whether or not a status of the print device is supported or unsupported by the universal print driver 12. In one embodiment, the set of DCPs can be stored in a local repository or local customer file store. A file store can be set up to contain the DCP files and a centralized location. In another embodiment, the repository is included at a web file server or remote repository 24 that is in communication with the print driver. The set of DCPs for a number of print devices can be hosted on the web file server, which is administered by a systems administrator ("SA"). In yet another embodiment, the server 24 can host a set of DCPs, and copies of the DCPs can be downloaded to the local repository 22.

Figure 2:
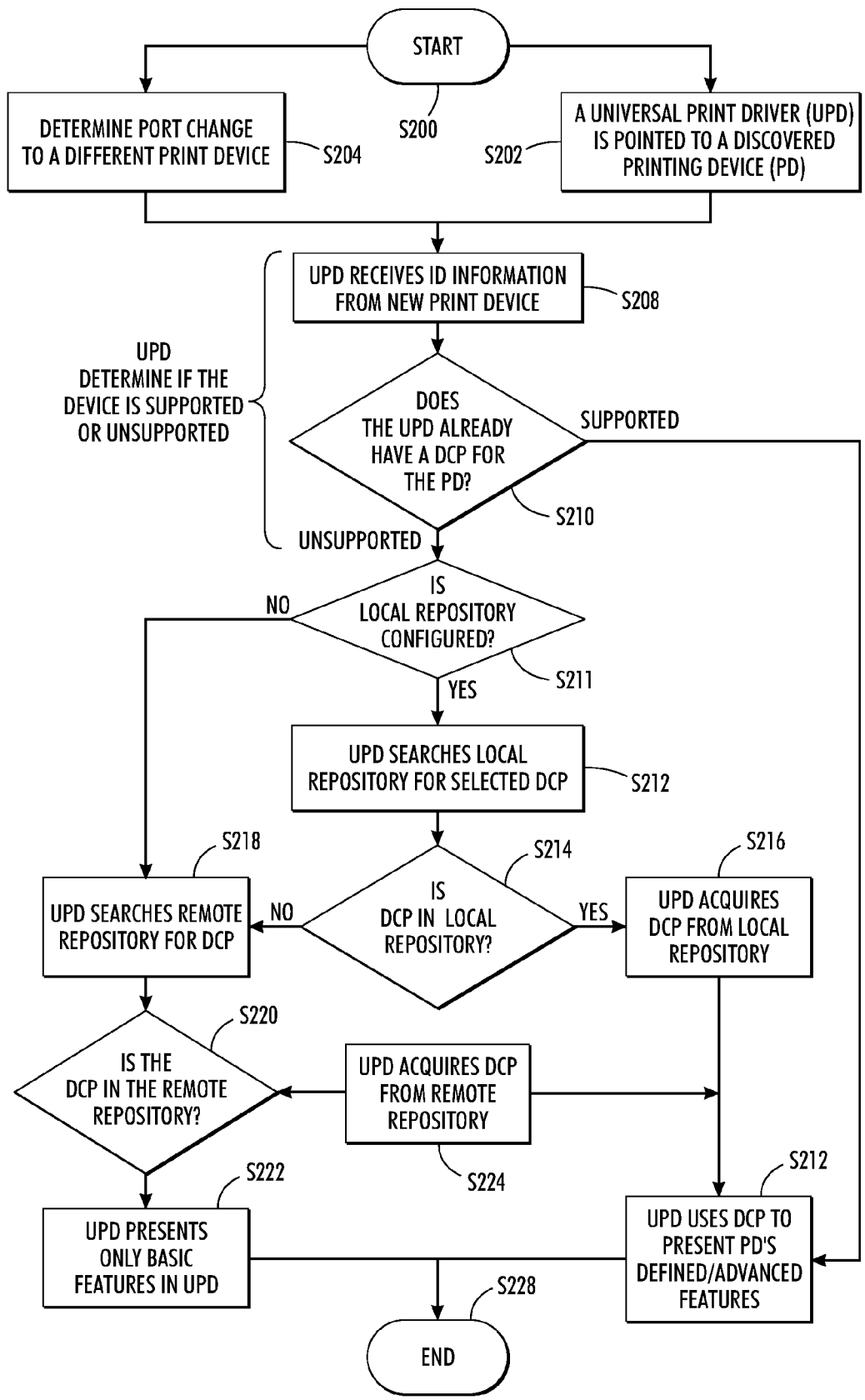
FIG. 2 is a flow-chart depicting a method performed by the system for providing the defined and advanced features of the print device.

Now referring to FIG. 2, a flowchart is shown for describing a process performed by the system for providing the defined and advanced features of a print device. A universal print driver is previously installed for purposes of teaching the present disclosure. If the previously launched universal print driver is a global print driver, a global print driver queue is already installed. The method starts at S200. The universal print driver points to a select print device at S202. In one (mobile type) embodiment, the select print device is a destination print device selected from a set of devices for producing the print job. In another (global type) embodiment, the universal print driver points to the print device that is assigned to the queue.

With continued reference to FIG. 2, the method may alternatively start when the universal print driver determines a port change at S204 from a first print device to a second print device, which is different from the first print device. Accordingly, the system next determines whether the discovered or different print device is a supported or unsupported device at S206. The system determines if the different or discovered print device is interfaced to the universal print driver after the universal print driver was deployed in the customer environment. For making the determination, the universal print driver receives the identification information from the print device at S208. The print device may provide and transmit this information based on a request transmitted by the universal print driver.

With continued reference to FIG. 2, the universal print driver receives a uniqueId from the print device and compares the identification with a list of known devices stored in the universal print driver. More specifically, the system uses the identification information of the print device to determine if the universal print driver already has a DCP installed for the print device at S210. If the determination indicates that a DCP is already installed in, or packaged with, the universal print driver, then the print device is recognized as a supported device. The universal print driver accesses the content included in the DCP of the supported device. The universal print driver uses the DCP of the supported device to present advanced features and capabilities, specific to the supported device, to the user on the GUI at S212. However, if the determination indicates that universal print driver does not have a DCP installed for the print device at S210, then the system identifies the device as an unsupported or new device. The system therefore proceeds to perform a method for supporting the device.

With continued reference to FIG. 2, the system uses the identification information of the unsupported (i.e., new) device for searching for a compatible DCP from available sources. These sources may include the Internet, administrator managed file shares, or print servers. In one embodiment (not shown), the print device can host its own DCP. The system determines the available sources at S211. For example, the universal print driver determines if a local repository has been configured for the client at S211. If there is a configured local repository, the universal print driver first queries the local repository for the selected DCP at S212. The local repository is a local customer file share that contains DCP files and a centralized location. In one embodiment, a SA sets up the file store and configures the client computer for accessing the DCP files from the file store. The universal print driver further stores the location of the local repository. However, embodiments are contemplated that provide for the universal print driver to search for newer and applicable DCPs on the specified central file share at S212 without using an SA control or Internet access.

With continued reference to FIG. 2, the universal print driver next determines if the DCP is in the local repository at S214. If the DCP is located, the universal print driver acquires the DCP from the local repository at S216. More specifically, the universal print driver downloads the relevant DCP and installs it so that the universal print driver can access the DCP data. After the DCP is installed on the universal print driver, the universal print driver pulls all the information it needs for the new print device from the DCP file. The universal print driver uses the information to provide the user with the advanced features of the new print device at S212.

With continued reference to FIG. 2, if the universal print driver determines that a local repository is not a source of the relevant DCP at S211 or the DCP is not acquired from the local repository at S214, the universal print driver searches a remote repository at S218. The remote repository can include a web file server. A provider of the print device, for example, can host the DCP for its devices on its own web file server. Therefore, DCPs that are not packaged with the universal print driver can be stored on the file store and obtained over the network from file server/store). The web file server can store a set of DCPs for a number of multiple print devices that the universal print driver is adapted to be used with. The system determines if the DCP is in the remote repository at S220. If the DCP is not found in the remote repository, the universal print driver presents only basic features of a print device to the user at the GUI at S222. In other words, the advanced features of the new print device cannot be used for producing the print job because the system cannot access a DCP that enables the printer capabilities. However, if the system determines that the DCP is in the remote repository at S220, the universal print driver acquires the DCP from the remote repository at S224. More specifically, the universal print driver downloads the relevant DCP from the remote repository and installs it in the universal print driver so that the universal print driver can access the DCP data. After the DCP is installed in the universal print driver, the universal print driver pulls all the information it needs for the new print device from the DCP file. The universal print driver uses the information to provide the user with the advanced features of the new print device at S212.

In another contemplated embodiment, the universal print driver can search the remote repository for new or updated DCPs, and then download the DCPs to the local repository until the downloaded DCPs are needed by the universal print driver. The method ends at S228, wherein the user can use the GUI to select print conditions for rendering the print job. In this manner, the universal print driver can learn about the new print device after the driver has been released and after it has been installed.

In yet another embodiment (not shown), the system can perform the disclosed method when the client invokes a check for DCPs. More specifically, the system can present an option on the GUI for prompting the user to check for updated or new DCPs. If the system does not receive a user-selected instruction for performing the query, the system can present the user with only the most basic options associated with the print device.

One aspect of the present disclosure is that the printing system is adapted for providing the most advanced print features for the print devices that it is interfaced with by downloading and installing respective DCPs of the devices after the universal print driver is deployed in a customer environment. The system is also adapted for selectively providing the most basic features of select print devices by selectively disabling DCP support.

A further embodiment of the disclosure includes a universal print driver that seeks out newer or updated versions of the respective DCPs that were previously installed on it. The present disclosure provides a mechanism by which the client can become aware of the updates made on the server (see 24 of FIG. 1). In one embodiment, the client is included in a Microsoft point-and-print environment. A conventional point-and-print environment includes a server and a number of clients. Typically, the print server houses dozens or hundreds of printer objects, which are each likely being used by dozens or hundreds of clients. When drivers are updated on the server in the point-and-print environment, the content is 'pushed' to each client by Microsoft through its print architecture. Therefore, each client has a synced/copied version of the print driver from the server.

When the SA performs a DCP update on the server, the server's registry data gets modified. Windows manages and syncs the changes to the clients automatically. In the conventional environment, Microsoft triggers automatic updates that are performed by the SA. As mentioned, a drawback of making the upgrade through the server in the conventional environment is that all connected print queues are affected.

The present disclosure, however, teaches a DCP that enables the SAs to effectively update the universal print driver (s) without re-installing new driver packages. The universal print driver is adapted to detect a mismatch between its registry data and its local DCP data after the synchronization. More specifically, the DCPs of the present disclosure are referenced and versioned in the PrinterDriverData section of the Windows registry for each printer object on the server. Any DCP updates made to the printer object can be reflected in a special registry key. Because the location is automatically kept in synch between the server and the client(s) by the system, the information is made available to clients. Accordingly, the universal print driver connected to the client is adapted to recognize when the newer content (i.e., the updated version of the DCP) is available on the server. When the mismatch occurs, the client/universal print driver pulls the new DCP data from the server. Accordingly, one aspect of the present disclosure is the ability to update DCPs in the Point-and-Print environment.

Figure 3:
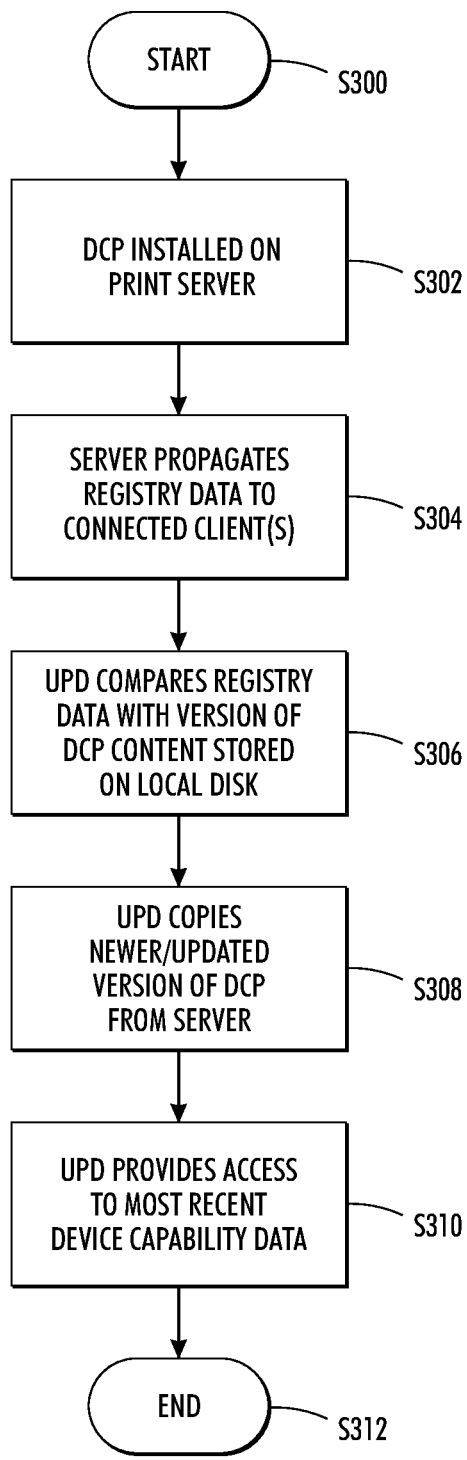
FIG. 3 is a flow-chart depicting a method performed by the system for updating a DCP using the universal print driver.

With reference to FIG. 3, a method is shown for updating a DCP according to the present disclosure. The method starts at S300. The universal print driver that is the subject of the present disclosure is adapted to automatically connect the client to the server from within the print driver. A DCP for an unsupported or new print device is installed on the print server at S302. A SA with a shared queue, for example, may install the DCP. The server propagates new registry data to connected clients at S304. When the client(s) opens the universal print driver after receiving the new registry data from the print server, the universal print driver compares the new registry data at S306, and specifically the DCP version, with the DCP content version stored on the local disk.

With continued reference to FIG. 3, based on the comparison of S306, the universal print driver determines whether the local content version of its DCP is outdated by an updated version of the DCP stored on the server. When the universal print driver notices this discrepancy, the universal print driver copies the updated/newer version of DCP data from the print server at S308. When the copy completes, the UPD provides access to the most recent product specific data, thus becoming a robust driver.

Although the method is illustrated and described herein in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system, wherein the disclosure is not limited to the specific applications and embodiments illustrated and described herein.

The present disclosure provides a knowledge-based universal print driver that is adapted to learn about new print devices after the universal print driver is deployed in a customer environment. This feature provides the universal print driver with an ability to support extensive, advanced printing features in multiple devices.

Another aspect of the present disclosure is a universal print driver that supports DCPs that provide it with an ability to refresh the driver functionality without breaking the WHQL signature.

Furthermore, another aspect of the present system is an ability for the universal print driver to search multiple sources for a DCP of a designated destination print device. Therefore, the system provides an SA with greater flexibility for deploying and updating the universal print driver and for selectively controlling the DCPs that are rolled out.

Yet another aspect of the present disclosure is a reduced footprint for the universal print driver by receiving the support of DCP(s).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for supporting multiple print devices interfaced with a previously installed print driver, the method comprising:
   providing a previously installed universal print driver with access to a repository of Device Compatibility Packs ("DCP"), each DCP being associated with one printer device and containing print device specific data;
   in response to discovering a printer device being selected for producing a print job and being interfaced to the print driver after the print driver was deployed in a customer environment, determining if the print driver already has a DCP installed for supporting the print device;

in response to determining the select printer device is not supported by the print driver, searching the repository by the print driver for a DCP of the select printer device and installing the DCP onto the print driver for supporting the select printer device and recognizing the select printer device as being supported by the print driver;

in response to recognizing the select printer device as the supported device, accessing the DCP by the print driver and using the information included in the DCP for presenting capability information of the select print device to a user; and, in response to not finding the DCP in the repository, presenting basic features of a print device to the user.

2. A method according to claim 1 further comprising:
providing the print driver with a print device identification associated with the select print device; and,
using the print device identification for determining if the select print device is supported by the print driver.

3. A method according to claim 2 further comprising:
using the print device identification for searching the repository for the DCP of the select print device if the select one print device is determined as not being supported by the print driver.

4. A method according to claim 1 further comprising:
providing the repository with a DCP obtained from a server if the DCP is not included in the set of print device specific files.

5. A method according to claim 1 further comprising:
providing the universal print driver with a location of the repository.

6. A method according to claim 1, further comprising:
determining if a local repository is configured; and,
searching the local repository if the local repository is configured and searching a remote repository if the remote repository is configured.

7. A method according to claim 1 further comprising:
providing a user with advanced functions of print device capabilities contained in the DCP.

8. A method according to claim 1 further comprising:
in response to recognizing the select printer device as the supported device, searching the repository and accessing an updated DCP by the print driver and using the information included in the updated DCP for presenting updated capability information of the select print device to the user.

9. A system for interfacing a previously installed universal print driver with a newly discovered printer device, the system including:
a universal print driver interfaced with a network and at least one associated printer device; and,
a repository for storing a set of device compatibility packs (DCPs) for each of the at least one associated printer device interfaced with the universal print driver;
wherein the universal print driver is adapted to:
in response to discovering the new printer device being interfaced to the print driver after the print driver was deployed in a customer environment,
determine if the newly discovered printer device is supported by the print driver,
search the repository for a DCP associated with the newly discovered printer device in response to the newly discovered printer device not being supported by the print driver,
install the DCP onto the print driver for supporting the newly discovered printer device; and,
use the information included in the DCP for rendering a printout using the newly discovered printer device.

10. A system according to claim 9, wherein the repository is a local repository having a location programmed in the universal print driver.

11. A system according to claim 10, wherein the repository is a remote repository hosted at the server.

12. A system according to claim 9, wherein the universal print driver is in communication with a server.

13. A system according to claim 9, wherein the universal print driver is adapted to install the DCP found in the repository for supporting the newly discovered printer device.

14. A system according to claim 13, wherein the universal print driver is adapted to provide advanced functions of the newly discovered printer device based on capability content included in the DCP if the DCP is found in the repository.

15. A system according to claim 9, wherein the universal print driver is adapted to provide basic functions of the newly discovered printer device if the DCP is not found in the repository.

16. A system according to claim 9, wherein the newly discovered printer device includes a print driver interfaced with the universal print driver and having a later version of a DCP installed on the universal print driver.

17. A previously installed print driver interfaced with a network and in communication with at least one associated print device, the print driver adapted to:
store a repository location;
in response to discovering an associated print device being selected for producing a print job and being interfaced to the print driver after the print driver was deployed in a customer environment, determine if the print driver includes a Device Compatibility Pack ("DCP") to support the associated print device;
in response to determining the print driver does not support the associated printer device, search the repository for the DCP of the associated print device;
in response to finding the DCP, install the DCP for supporting the associated print device if the DCP and recognize the associated print device as supported by the print driver;
in response to recognizing the associated print device, accessing the DCP and using the information included in the DCP for presenting advanced capability information of the associated print device to a user; and,
in response to not finding the DCP in the repository, presenting basic capability information of an associated print device to the user.

18. A print driver according to claim 17, wherein the print driver determines if the associated print device is being supported by receiving identification information of the associated print device and comparing the identification information with a list of DCPs installed in the universal print driver for determining if a DCP corresponding to the associated print device is installed in the print driver.

19. A print driver according to claim 17, wherein the print driver is adapted to update a version of the DCP installed on the print driver after the print driver was deployed in the customer environment.

* * * * *